United States Patent [19]

Camiciottoli et al.

[11] 3,739,098

[45] June 12, 1973

[54] SYSTEM FOR THE REMOTE SUPERVISION OF MULTICHANNEL PCM REPEATERS

[75] Inventors: Roberto Camiciottoli, Guiseppe Grossi, both of Milan, Italy

[73] Assignee: Societa Italiana Telecommunicazioni Siemens S.P.A., Milan, Italy

[22] Filed: Mar. 27, 1972

[21] Appl. No.: 238,314

Related U.S. Application Data

[63] Continuation-in-part of Ser. No. 198,788, Nov. 15, 1972.

[30] Foreign Application Priority Data

Mar. 26, 1971 Italy .............................. 22336 A/71

[52] U.S. Cl.... 179/15 AD, 179/15 BY, 179/15 BF, 179/175.31

[51] Int. Cl. .............................................. H04j 3/02

[58] Field of Search ..... 179/15 BF, BY, AD, 175.31

[56] References Cited

UNITED STATES PATENTS

| | | | |
|---|---|---|---|
| 3,100,869 | 8/1963 | Disson | 179/15 BF |
| 3,153,701 | 10/1964 | Oshima | 179/15 AD |

*Primary Examiner*—Ralph D. Blakeslee
*Attorney*—Karl F. Ross

[57] ABSTRACT

A proximity detector and alarm in which an antenna is connected to the gate of a metal oxide semiconductor field effect transistor MOSFET which causes a silicon controlled switch (SCS) to trigger a blocking oscillator. a processor

6 Claims, 5 Drawing Figures

SYSTEM FOR THE REMOTE SUPERVISION OF MULTICHANNEL PCM REPEATERS

This application is a continuation-in-part of our copending application Ser. No. 198,788 filed Nov. 15 1972.

Our present invention relates to a system for the remote supervision of a number of cascaded repeating stations inserted in the signal path of a multichannel transmission path using pulse-code modulation.

In such a PCM system it is convenient to provide, at each of a series of $n$ repeating stations, a common housing for $m$ repeaters serving a like number of channels. Usually, $m$ is an even number and the repeaters of each stations are divided into two equal subgroups of $m/2$ units each, one subgroup serving for the transmission in one direction whereas the other subgroup handles the opposite traffic.

The system disclosed in our copending application comprises, in a control unit connected to the service line, a code generator which is selectively settable to produce $n$ different interrogation codes respectively addressed to the several repeating stations. A processor at each of these stations includes a discriminator which is connected to the service line for generating an enabling signal upon detecting an interrogation code addressed to that station, this enabling signal serving to activate a responder also receiving the outputs of $m$ monitoring circuits respectively connected across the several repeaters of that station. If each of these repeaters operates properly, a consent signal is generated which triggers the responder to generate a reply code (in a simple case a single pulse) sent back to the control unit to indicate the satisfactory working condition of the interrogated station. If, however, the performance of any repeater is faulty, a succession of error signals (i.e. inverted consent signals) generated by the associated monitoring circuit during consecutive test cycles inhibits the generation of he reply code whereby a malfunction indicator at the control unit is actuated to register the defective condition of one or more repeaters at the interrogated station.

As further described in the copending application, the several interrogation codes differ from one another by containing a variable number of address pulses identifying the several repeating stations. Thus, the number of these address pulses may range from 1 through $n$, or preferably through $2n$ in order to distinguish between the outgoing and the incoming repeaters of each station. A first pulse counter in the control unit, stepped by the output of a clock circuit, is presettable (e.g. manually) to identify a selected station by counting a corresponding number of clock pulses and, upon arrival at the selected count, to generate a stop signal which triggers a timing circuit to operate an electronic gate inserted between the source of clock pulses and a transceiver converting these clock pulses into address pulses. The timing circuit suppresses these address pulses for a predetermined recovery interval during which another timing means, such as a monoflop, switches the transceiver from a transmitting condition to a receiving condition for an answer-back period constituting a predetermined fraction of that interval. At the interrogated repeating station identified by the address pulses, a second pulse counter receiving the interrogation code from another transceiver generates the enabling signal for the responder upon termination of the incoming address pulses on a count individual to that station. The first transceiver, at the control unit, and the second transceiver, at each repeating station, are synchronized by a line voltage which is generated by the first transceiver to indicate its transmitting or receiving condition; the second transceiver thereupon assumes a complementary condition, i.e. a receiving state when the control unit transmits and vice versa.

Advantageously, the control unit is designed as a portable module adapted to be plugged into the service line at either terminal of the signal path or at any intermediate repeating station. In this manner, not only a straight transmission path but also a branched (e.g. star-shaped) network may be checked out.

Such a system can be used for jointly monitoring the repeaters of any station, with the aid of a single service line common to all the retreating stations, regardless of the number of such stations and the length of the transmission path, without interfering with the simultaneous transmission of messages even if part of the transmitted high-frequency energy is utilized for supplying power to the repeaters and to the supervisory units associated therewith. It is, however, incapable of ascertaining the condition of a specific repeater in a selected station; such a determination, therefore, requires the transmission of a special code over an individual channel including the repeater in question, e.g. as described in commonly owned application Ser. No. 212,283 filed Dec. 27 1971 by Dino Marchini.

The general object of our present invention, therefore, is to provide an improved system of this character enabling the selective testing of any repeater during normal operation by means of code signals transmitted over the service line.

In accordance with the present improvement, the control unit connected to that service line further includes selector means operable to produce a variety of identification codes for the several repeaters of any station, advantageously a manually trippable monoflop serving as a source of identification pulses whose width substantially exceeds that of the address pulses. The code detector in the processor of each repeating station includes means, specifically a pulse-width discriminator, for unblocking a normally blocked output of the monitoring circuit associated with the repeater identified by the transmitted code so as to give passage to a consent signal triggering the generation of the reply code in the presence of an enabling signal from a preset address decoder. With a respective subgroup of $m/2$ repeaters used for transmission in either direction, two such address decoders connected to the second pulse counter generate separate enabling signals in response to interrogation codes identifying one or the other subgroup, the responder then comprising two sets of $m/2$ coincidence (AND, Nor or NAND) gates each which are respectively connected to these address decoders for parallel energization thereby; a third pulse counter, fed by the pulse-width discriminator so as to respond only to identification pulses, has a counting capacity for $m/2$ such pulses giving rise in its own decoder to respective unblocking signals each transmitted to one coincidence gate from each set whereby only the monitoring circuit of the selected repeater is unblocked to transmit a consent signal if that repeater operates properly. If it does not, the reply code is not generated with resulting actuation of a lamp or other alarm means in the malfunction indicator of the control unit.

A further feature of our invention resides in the provision of a clearing-pulse generator which, like the source of identification pulses, may be a manually trippable monoflop and which emits a pulse of a duration substantially exceeding that of the identification pulses. The pulse-width discriminator, which may comprise a combination of several integrators with different time constants, directs this clearing pulse to the resetting inputs of the second and third counters which can therefore be set to zero before the emission of the next identification code followed by the address pulses.

The above and other features of our invention will be described in detail hereinafter with reference to the accompanying drawing in which.

Figure 1:
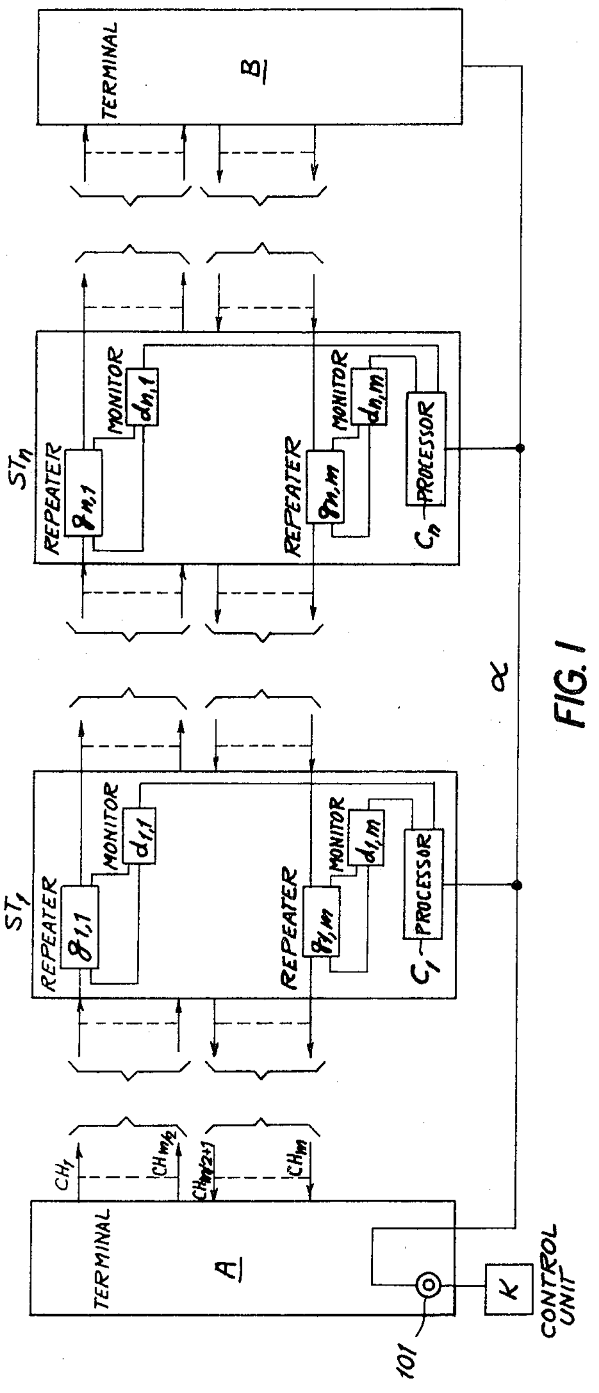
FIG. 1 is an overal block diagram of a supervisory system embodying our invention.

FIG. 1 shows part of a transmission path, extending between two terminal stations A and B, which includes a number of repeating stations $ST_1 \ldots ST_n$. These repeating stations are all of identical construction (as described in detail in our copending application) and include a plurality of repeaters $g_{1,1} \ldots g_{1,m}$ through $g_{n,l} \ldots g_{n,m}$. These repeaters serve $m/2$ outgoing channels $CH_1 \ldots CH_{m/2}$, transmitting from terminal A to terminal B, and $m/2$ incoming channels $CH_{m/2+1} \ldots CH_m$, transmitting in the opposite direction. Connected across each repeater within the station housing is a monitoring circuit $d_{1,1} \ldots d_{1,m}$ through $d_{n,1} \ldots d_{n,m}$, all the monitoring circuits of one station working into a common processor $C_1 \ldots C_n$ (generically designated $C_j$, FIG. 4) inside the housing.

All the processors $C_1 \ldots C_n$ are connected in parallel to a service line $\alpha$ extending between terminals A and B. At terminal A, a control unit K is plugged into the station housing at 101 to connect with line $\alpha$; this unit could also be pluggable into the housings of repeater stations $ST_1 \ldots ST_n$ or of terminal B.

Figure 5:
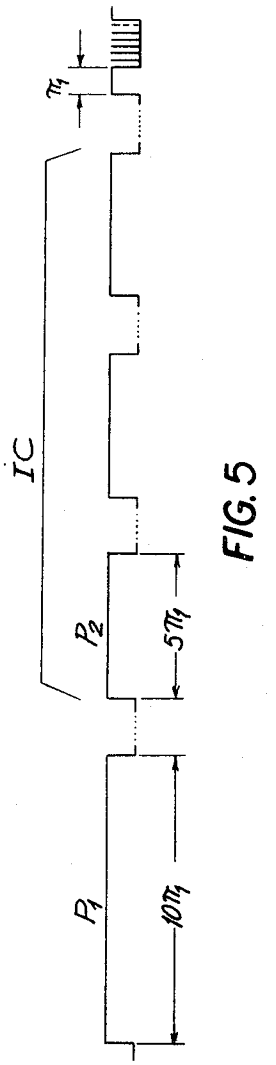
FIG. 5 is a further graph specifically relating to the present improvement.
Figure 2:
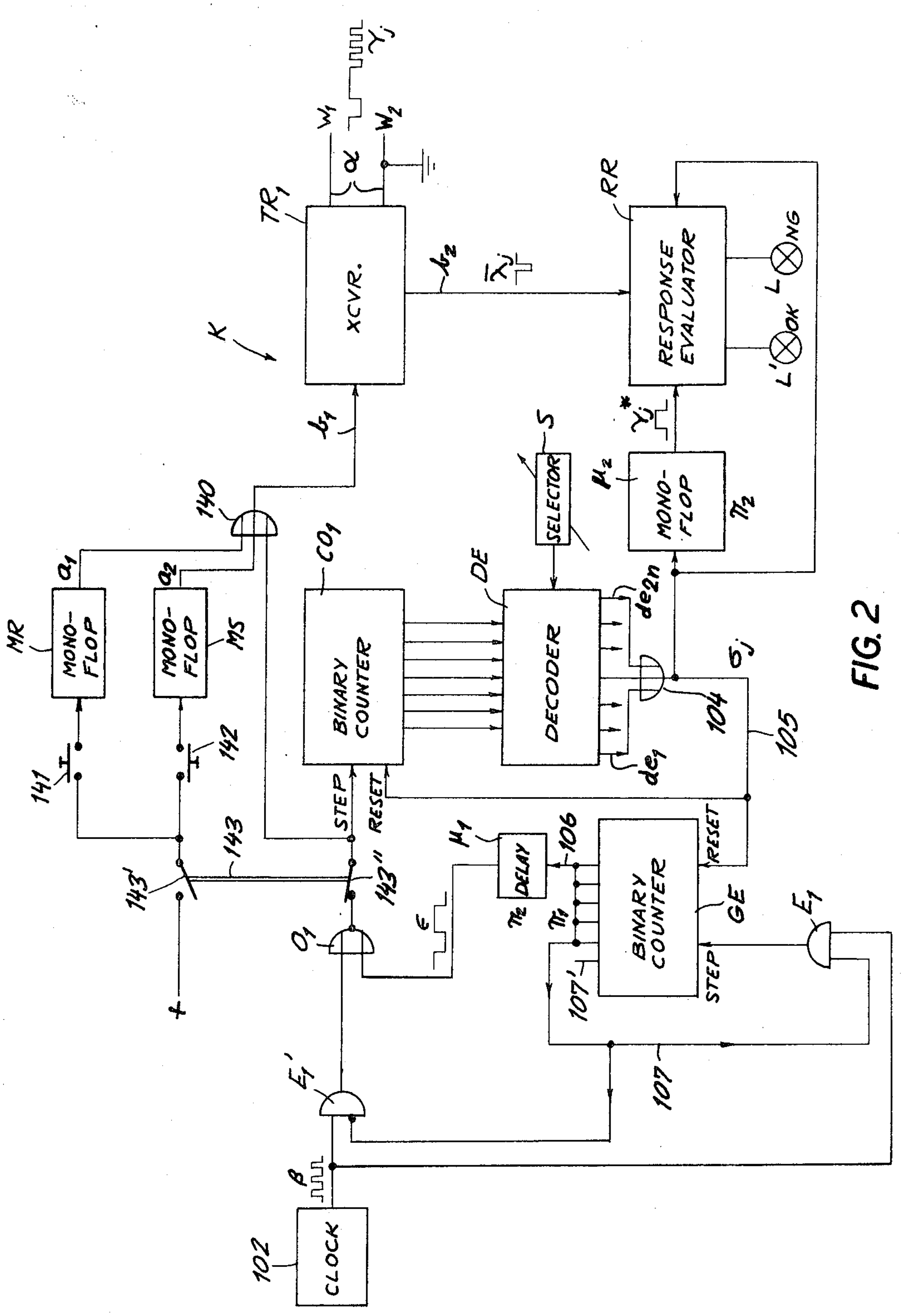
FIG. 2 is a more detailed block diagram of a control unit forming part of the system.

Details of processing unit K have been illustrated in FIG. 2. A binary counter $CO_1$ works into a decoder DE with output leads $de_1 \ldots de_{2n}$ any one of which can be marked by a manual selector S for energization upon attainment of the corresponding pulse count. A clock circuit 102 emits a continuous pulse train $\beta$ on a lead 103 terminating at two AND gates $E_1$ and $E'_1$; gate $E'_1$ works through a NOR gate $0_1$ into a stepping input of counter $CO_1$ and in parallel therewith, through an OR gate 140, into an input lead $b_1$ of a transceiver $TR_1$. This transceiver is directly connected across the service line $\alpha$ shown to consist of two wires $w_1$ and $w_2$, the latter being grounded. An output lead $b_2$ of transceiver $TR_1$ extends to a response evaluator RR provided with visual indicating means in the form of a pair of lamps L and L'. Lamp L' lights when a designated repeater at an interrogated repeating station operates properly whereas lamp L is illuminated upon the detection of a faulty condition of that repeater, as determined by an identification code IC (FIG. 5) and an interrogation code $\gamma_j$ transmitted over the line $\alpha$ and by the presence or absence of a reply code $\lambda_j$ appearing on lead $b_2$. Details of the response evaluator RR, not material to the present improvement, have also been disclosed in the copending application referred to.

Decoder DE generates a stop signal $\sigma_j$ on an output lead $de_j$ as soon as counter $CO_1$, after having been set to zero, has received the corresponding number ($j$) of clock pulses $\beta$ from source 102. Signal $\sigma_j$ traverses an OR gate 104, combining all the output leads of decoder DE, and appears on a lead 105 terminating at respective resetting inputs of counter $CO_1$ and response evaluator RR. Lead 105 is further connected to a monoflop $\mu_2$, feeding an input of evaluator RR, and to a resetting input of a timing circuit GE also constituted by a binary pulse counter. Timer GE has a number of counting stages with interconnected output leads merging into a conductor 106, which extends to the second input of NOR gate $0_1$ by way of a delay circuit $\mu_1$, and into another conductor 107 tied to the second input of AND gate $E_1$ and to the inverting second input of AND gate $E'_1$.

Upon the energization of lead 106, circuit $\mu_1$ generates a delayed pulse $\epsilon$ after a time $\pi_2$ which equals the off-normal period of monoflop $\mu_2$ and is a fraction of a recovery interval $\pi_1 + \pi_2$ measured by timer GE. This recovery interval starts as soon as the timer is reset by pulse $\sigma_j$ on lead 105 and energizes the leads 106 and 107 for a predetermined number of clock cycles. Voltage on lead 107 now blocks the gate $E'_1$ but opens the gate $E_1$ to the clock pulses $\beta$ whereby the timing counter is progressively stepped until the energization shifts from output lead 107 to a lead 107' which need not have any physical existence but has been indicated only for the sake of explanation. At this point, gate $E_1$ is closed to arrest the count whereas gate $E'_1$ is opened to pass the clock pulses $\beta$ to NOR gate $0_1$.

Figure 3:
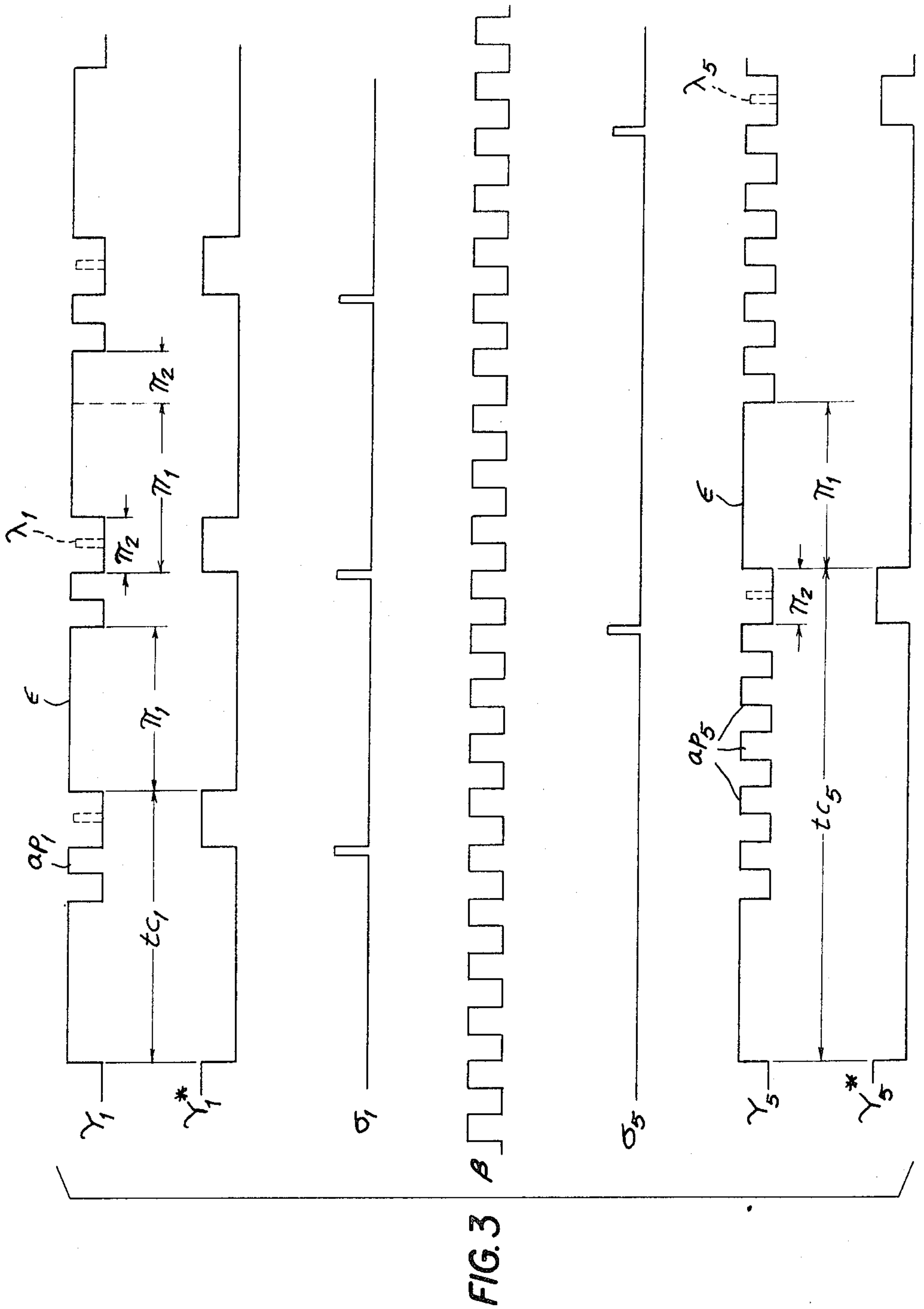
FIG. 3 is a set of graphs serving to explain the operation of the control unit of FIG. 2.

Reference will now be made to FIG. 3 which illustrates the results of the mode of operation just described. The top graph of that Figure represents an interrogation code $\gamma_1$ destined for the first repeating station $ST_1$ of FIG. 1; the second-lowest graph shows the corresponding code $\gamma_5$ addressed to the fifth repeating station of the system. These two codes, appearing on line $\alpha$ in alternate positions of selector S, differ from each other by the number of address pulses occurring in their respective test cycles $tc_1$ and $tc_5$. Thus, code $\gamma_1$ has a single address pulse $ap_1$ per cycle whereas code $\gamma_5$ has five such pulses $ap_5$. These address pulses are generated in the output of transceiver $TR_1$ by the clock pulses $\beta$ which traverse and AND gate $E'_1$ and cut off the NOR gate $0_1$ as long as the timer lead 107 is not energized. Since these clock pulses also reach the counter $CO_1$, stop signal $\sigma_1$ or $\sigma_5$ is generated (depending on the position of selector S) after one or five clock cycles, respectively, as shown in the third and fifth graphs of FIG. 3. With the appearance of this stop signal, the voltage on lead 107 shifts the clock pulses $\beta$ from counter $CO_1$ to counter GE which now advances, maintaining the energization of the lead 107 for a certain number of clock cycles (three in the example of FIG. 3) which together constitutes a timing interval $\pi_1$. During the first portion $\pi_2$ (here equaling one clock cycle) of this timing interval, however, delay circuit $\mu_1$ has no output so that NOR gate $o_1$ conducts and energizes the input lead $b_1$ of transceiver $TR_1$, thereby substantially grounding the wire $w_1$ of line $\alpha$ as more fully described in the copending application; this period $\pi_2$, preceding the appearance of signal $\epsilon$ in the input of gate $0_1$, represents an answer-back interval during which a reply code in the form of a pulse may come back from the addressed station over line $\alpha$. Coincidentally with this answer-back interval, a pulse $\gamma^*_1$ or $\gamma^*_5$ ($\gamma^*_j$ in FIG. 2) appears in the output of monoflop $\mu_2$ as illustrated in the second graph and the last graph of FIG. 3, respectively, thereby making the evaluator RR receptive to the reply pulse, if any, on lead $b_2$. It should be noted that the pulse appearing in the output of NOR gate $0_1$ during the period $\pi_2$ does not advance the counter $CO_1$ into a position effective to energize any of the outputs of decoder DE; this may be accomplished by a suitable extension of the decay period of the resetting pulse derived from signal $\sigma_j$, or by the insertion of a dummy stage in the counter.

OR gate 140 has two further inputs respectively energizable, over leads $a_1$ and $a_2$, from a pair of monoflops MR and MS adapted to be tripped by the temporary closure of two pushbutton switches 141, 142 in series with an armature 143' of a switch 143 having another armature 143'' inserted in the output of NOR gate $0_1$. In the illustrated position of switch 143, pushbuttons 141 and 142 are disconnected from potential so that their actuation would be ineffectual; in the alternate position of that switch, the stepping circuit of counter $CO_1$ is open and the pulses from clock circuit 102 are unable to reach the transceiver $TR_1$. In this situation, depression of pushbutton 141 generates a clearing pulse $P_1$, FIG. 5, of a duration equaling 10 periods $\pi_1$; thereafter, pushbutton 142 may be depressed one or more times to indicate the number of the channel containing the repeater to be tested. With $m = 10$, i.e. with 5 channels transmitting from terminal A to terminal B and 5 channels transmitting in the opposite direction, a single pulse $P_2$ generated by monoflop MS identifies the first and the tenth channel; two such pulses designate the second and ninth channels, and so on. Thus, a maximum number of $m/2 = 5$ pulses are needed to indicate a particular repeater in a station identified with the aid of selector S; the specific code IC shown in FIG. 5, consisting of three pulses $P_2$, selects repeaters Nos. 3 and 8. Identification pulses $P_2$ (FIG. 5) have a width of 5 $\pi_1$, half that of pulse $P_1$, which is still greater than the duration of the maximum possible number of consecutive address pulses $ap_{2n}$.

Figure 4:
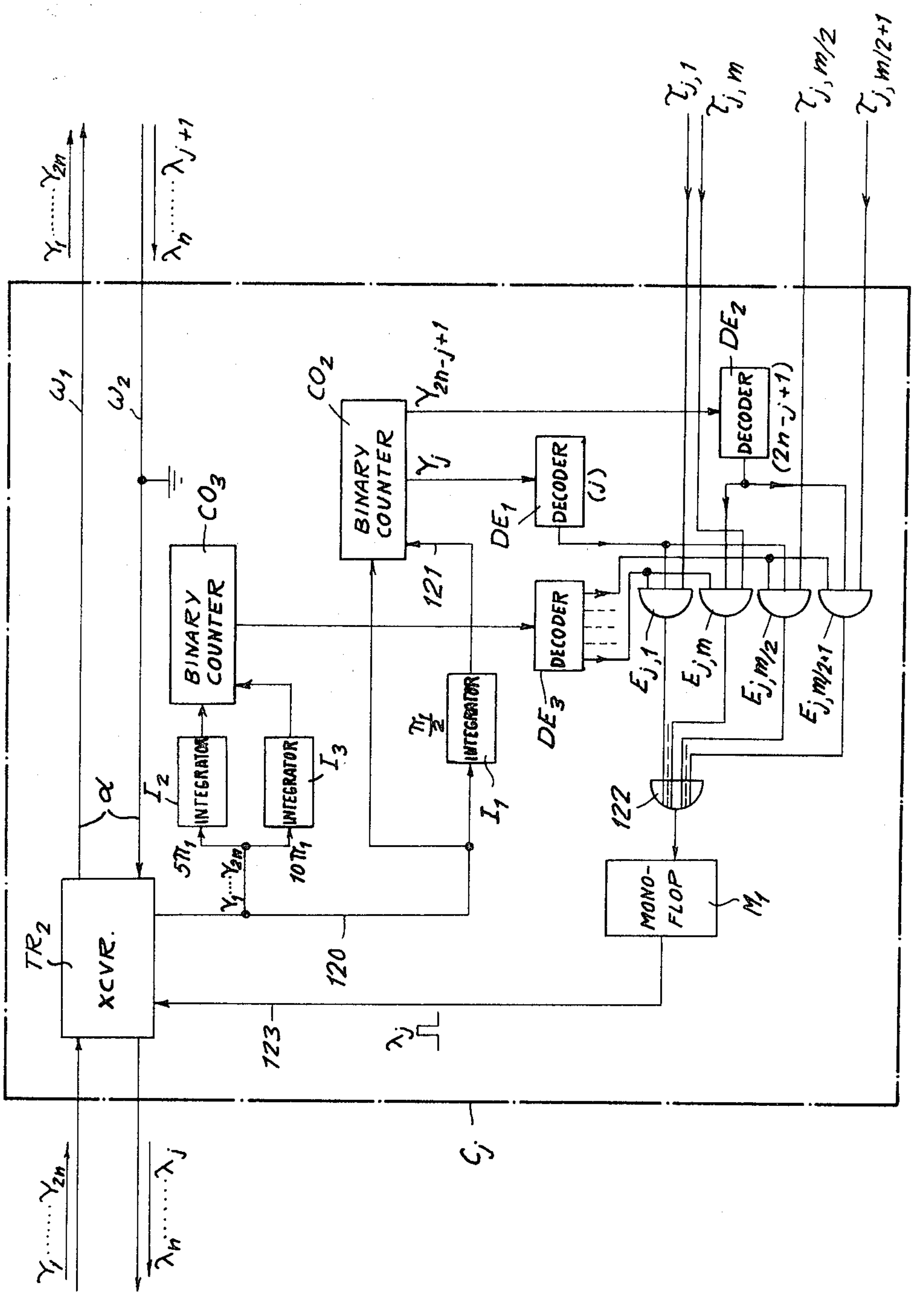
FIG. 4 is a more detailed block diagram of a processor in a repeating station included in the system of FIG. 1.

Reference will now be made to FIG. 4 for a description of the processor $C_j$ of the generalized repeating station $ST_j$. This processor comprises a transceiver $TR_2$, connected across line $\alpha$, whose construction may be similar to that of transceiver $TR_1$.

With the transceiver $TR_1$ of control unit K (FIG. 2) in its transmitting condition, interrogation codes $\gamma_1 \ldots \gamma_{2n}$ pass through the transceiver $TR_2$ over line $\alpha$ and also appear on a lead 120 branched off the wire $w_1$ of that line. Lead 120 extends to an integrator $I_1$ and, in parallel therewith, to a stepping input of a binary counter $CO_2$ similar to counter $CO_1$ of unit K. Counter $CO_2$ feeds two associated decoders DE' and DE'' respectively responding to counts of value "$j$" and "$2n-j+1$." Thus, decoder DE' has an output whenever an interrogation code $\gamma_j$ is transmitted over the line to check the operation of the $m/2$ repeaters of station $ST_j$ transmitting in the direction of traffic from terminal A to terminal B (FIG 1); decoder DE'' responds to an interrogation code $\gamma_{2n-j+1}$ addressing the remaining repeaters of station $ST_j$ which serve for the transmission from terminal B to terminal A. Decoder DE' works into respective inputs of a set of $m/2$ AND gates $E_{j,1} - E_{j,m/2}$ having second inputs which receive respective consent signals $\tau_{j,1} - \tau_{j,m/2}$ from the several monitoring circuits associated with the first subgroup of $m/2$ repeaters; in an analogous manner, decoder DE'' feeds another set of $m/2$ AND gates $E_{j,m/2+1} - E_{j,m}$ having second inputs connected to receive similar consent signals $\tau_{j,m/2+1}-\tau_{j,m}$ from the monitoring circuits serving the second subgroup of $m/2$ repeaters. Paired AND gates $E_{j,1}$ and $E_{j,m}$ ... $E_{j,m/2}$ and $E_{j,m/2+1}$ have third inputs energized in parallel from respective outputs of a decoder $DE_3$ fed by a further binary counter $CO_3$; the latter has a stepping input and a resetting input connected to lead 120 via respective integrators $I_2$ and $I_3$.

Integrators $I_1$, $I_2$ and $I_3$ have time constants of substantially $\pi_1/2$, $5\pi_1$ and $10\pi_1$, respectively. Thus, a clearing pulses $P_1$ from the monoflop MR of FIG. 2 loads integrators $I_1$ and $I_3$ sufficiently to reset the counters $CO_2$ and $CO_3$ to zero; an identification pulse $P_2$ from monoflop MS also zeroizes the counter $CO_2$ (if it was not previously reset) but steps the counter $CO_3$ which thereupon commands the decoder $DE_3$ to unblock the two AND gates selected by the number of these pulses. The subsequently received address pulses have no effect upon the position of counter $CO_3$.

Thus, after the operator at terminal A has cleared the counters and selected an outgoing or incoming repeater to be tested in one of the stations, he moves the switch 143 into the position illustrated in FIG. 2. Thereupon the control unit K functions in the aforedescribed manner, in conformity with the setting of selector S; the appearance of interrogation codes $\gamma_1 \ldots \gamma_{2n}$ on lead 120 steps the counter $CO_2$ according to the number of address pulses of that code. After the cessation of these address pulses, i.e. during period $\pi_1$, integrator $I_1$ energizes the resetting input 121 of counter $CO_2$. Decoder DE', DE'' have outputs only if the contents of the counter $CO_2$, as read out during the answer-back period $\pi_2$ (see FIG. 3) before restoration to zero, match their setting. In that case, the decoder so activated conditions the associated AND gates for conduction if their two other inputs are simultaneously energized by a consent signals and by the output of decoder $DE_3$, which will be true for only one AND gate of the interrogated station. The output of the conducting AND gate then trips a monoflop $M_1$, via an OR gate 122, to generate the reply pulse $\lambda_j$ on a lead 123 which joins the live line wire $w_1$ within transceiver $TR_2$.

It will thus be apparent that, as shown in FIG. 4, all the interrogation codes $\gamma_1 \ldots \gamma_{2n}$ pass successively from left to right through the transceivers $TR_2$ of the $n$ repeating stations of the system whereas the individual reply codes $\lambda_j$ travel from right to left, i.e. toward control unit K, through the transceivers of all the intervening stations.

We claim:

1. A system for the remote supervision of a series of $n$ repeating stations inserted in a PCM signal path with $m$ channels, each station containing $m$ repeaters individually assigned to said channels, comprising:

a service line extending along said path;

a control unit connected to said line for transmitting interrogation codes thereover to said stations during successive test cycles and receiving reply codes therefrom indicative of the performance of the repeaters of each station, said control unit including a code generator selectively settable to produce n different interrogation codes respectively addressed to said stations, said control unit further including selector means operable to produce a variety of identification codes for the several repeaters of any station;

a group of *m* monitoring circuits with normally blocked outputs respectively connected across the *m* repeaters of each station for generating a consent signal upon proper performance of the associated repeater;

a processor at each station including detector means connected to said line for generating an enabling signal upon detecting an interrogation code addressed to the respective station, said detector means being responsive to said identification codes for unblocking the output of the monitoring circuit associated with a repeater identified thereby to give passage to said consent signal, said processor further including responder means connected to said detector means and to said monitoring circuits for generating a reply code in the presence of said enabling signal and of said consent signal; and indicator means in said control unit for registering the nonarrival of a reply code in a succession of test cycles.

2. A system as defined in claim 1 wherein said control unit comprises a source of clock pulses, a first pulse counter connected to said source, selector means for setting said first pulse counter to produce a stop signal upon its count reaching a value assigned to a selected repeating station, first transceiver means on said line switchable between a transmitting condition and a receiving condition, gating means inserted between said source and said first transceiver means for converting said clock pulses into address pulses, first timing means responsive to said stop signal for operating said gating means to terminate the transmission of said address pulses upon said count reaching said assigned value and to resume such transmission after a predetermined recovery interval, and second timing means responsive to said stop signal for establishing said receiving condition during an answer-back period constituting a predetermined fraction of said recovery interval, said selector means including a source of identification pulses substantially wider than said address pulses; said detector means comprising second transceiver means on said line responsive to a line voltage indicative of the condition of said first transceiver means for assuming a complementary condition, discriminator means connected to said second transceiver means for separating said identification pulses from said address pulses, a second pulse counter connected to said discriminator means for receiving said address pulses therefrom and for generating said enabling signal upon termination of said address pulses on a count individual to the respective station, a third pulse counter connected to said discriminator means for receiving said identification pulses therefrom, and decoding means connected to said third pulse counter for controlling the unblocking of the output of the monitoring circuit associated with the repeater identified thereby.

3. A system as defined in claim 2 wherein said discriminator means comprises a first integrator of relatively short time constant connected to a resetting input of said second pulse counter and a second integrator of relatively long time constant connected to a stepping input of said third pulse counter, said second transceiver means having an output lead connected in parallel to said integrators and to a stepping lead of said second pulse counter.

4. A system as defined in claim 3 wherein said control unit is provided with a clearing-pulse generator with a pulse period substantially exceeding the width of said identification pulses, said discriminator means further comprising a third integrator connected to a resetting input of said third pulse counter, said third integrator having a time constant longer than that of said second integrator for resetting said third counter only in response to a clearing pulse from said generator.

5. A system as defined in claim 4 wherein said source of identification pulses and said clearing-pulse generator are a pair of manually trippable monoflops.

6. A system as defined in claim 2 wherein *m* is an even number, said repeaters and monitoring circuits being divided into two equal subgroups respectively serving for the transmission of PCM messages over said path in two directions, said detector means including two address decoders connected to said second pulse counter for generating two separate enabling signals in response to interrogation codes identifying either of said subgroups, said responder means comprising two sets of $m/2$ coincidence gates each which are respectively connected to said address decoders for parallel energization thereby, said third pulse counter having a counting capacity for $m/2$ identification pulses giving rise to respective unblocking signals each transmitted by said decoding means to one coincidence gate from each set.

* * * * *